United States Patent
Nakamura et al.

(10) Patent No.: US 6,597,740 B2
(45) Date of Patent: Jul. 22, 2003

(54) VARIABLE-LENGTH ENCODING AND DECODING APPARATUS

(75) Inventors: Tsuyoshi Nakamura, Kasuya-gun (JP); Kohkichi Hashimoto, Kawasaki (JP); Koji Imura, Machida (JP)

(73) Assignee: Matsushita Electric Industrial Co., Ltd. (JP)

( * ) Notice: Subject to any disclaimer, the term of this patent is extended or adjusted under 35 U.S.C. 154(b) by 222 days.

(21) Appl. No.: 09/871,151

(22) Filed: Jun. 1, 2001

(65) Prior Publication Data

US 2002/0015533 A1 Feb. 7, 2002

(30) Foreign Application Priority Data

Jun. 1, 2000 (JP) ........................ 2000-164991

(51) Int. Cl.[7] ................................ H04N 7/12
(52) U.S. Cl. ................................ 375/240.23
(58) Field of Search ............... 375/240.23, 240.27; 382/246; 341/67, 59; 381/22; 714/779

(56) References Cited

FOREIGN PATENT DOCUMENTS

JP          9-130792          5/1997

Primary Examiner—Chris Kelley
Assistant Examiner—George A Bugg
(74) Attorney, Agent, or Firm—Parkhurst & Wendel, L.L.P.

(57) ABSTRACT

The present invention provides a variable-length encoding and decoding apparatus which, when an overlap of a variable-length code and a synchronizing word is generated on a bit stream due to a transmission error or the like in the variable-length encoding and decoding apparatus of an image compression bit stream, can exactly detect the synchronizing word and a state where the overlap is generated. The variable-length encoding and decoding apparatus has a synchronizing word detecting unit 119 which detects the synchronizing word of the bit stream in a first shift register 104, a synchronizing word position management unit 122 which sets a head bit position of the synchronizing word at the timing that the head of the synchronizing word which exists in the first shift register 104 is moved to the second shift register 109 and thereafter updates the same, a variable-length encoding and decoding unit 113 which performs decoding processing of the variable-length code of the second shift register 109 and simultaneously obtains the code length of the variable-length code, and an overlap detecting unit 115 which detects the overlap of the synchronizing word and the variable-length code by the code length of the variable-length code and the head bit position of the synchronizing word.

7 Claims, 10 Drawing Sheets

Fig.3(a) Example of conventional variable-length code table

| No. | variable-length code | data to be decoded | code length of variable-length code |
|---|---|---|---|
| 1 | 010 | 001 | 3 |
| 2 | 0010 | 010 | 4 |
| 3 | 00010 | 011 | 5 |
| 4 | 00001010 | 100 | 8 |
| 5 | 00001000 | 101 | 8 |
| 6 | 000001100 | 110 | 9 |
| 7 | No correspondence | 000 | 0 |

Fig.3(b) Example of variable-length code table (1)

| No. | variable-length code | data to be decoded | code length of variable-length code |
|---|---|---|---|
| 1 | 010 | 001 | 3 |
| 2 | 0010 | 010 | 4 |
| 3 | 00010 | 011 | 5 |
| 4 | 00001010 | 100 | 8 |
| 5 | 00001000 | 101 | 8 |
| 6 | 000001100 | 110 | 9 |
| 7 | No correspondence | 000 | 9 (maximum value of code length in No.1~6) |

Fig.3(c) Example of variable-length code table (2)

| No. | variable-length code | data to be decoded | code length of variable-length code |
|---|---|---|---|
| 1 | 010 | 001 | 3 |
| 2 | 0010 | 010 | 4 |
| 3 | 00010 | 011 | 5 |
| 4 | 00001010 | 100 | 8 |
| 5 | 00001000 | 101 | 8 |
| 6 | 000001100 | 110 | 9 |
| 7 | No correspondence | 000 | value which is obtained by adding 1 to the number of bits which front-coincide with each other in variable-length code of No.1~6 |

Fig.4(a)

byte align point

Fig.4(b)

byte align point

start code value

| type of start code | start code value (hexadecimal) |
|---|---|
| video_object_start_code showing start of video object | 00 through 1F |
| video_object_layer_start_code showing start of video object layer | 20 through 2F |
| visual_object_sequence_start_code showing start of visual session | B0 |
| visual_object_sequence_end_code showing end of visual session | B1 |
| user_data_start_code showing start of user data | B2 |
| group_of_vop_start_code showing start of GOV header | B3 |
| video_session_error_code | B4 |
| visual_object_start_code showing start of visual object | B5 |
| vop_start_code showing start of video object plane | B6 |

VARIABLE-LENGTH ENCODING AND DECODING APPARATUS

FIELD OF THE INVENTION

The present invention relates to a variable-length encoding and decoding apparatus for encoding or decoding an image compression bit stream according to the MPEG standard.

BACKGROUND OF THE INVENTION

Figure 7A:
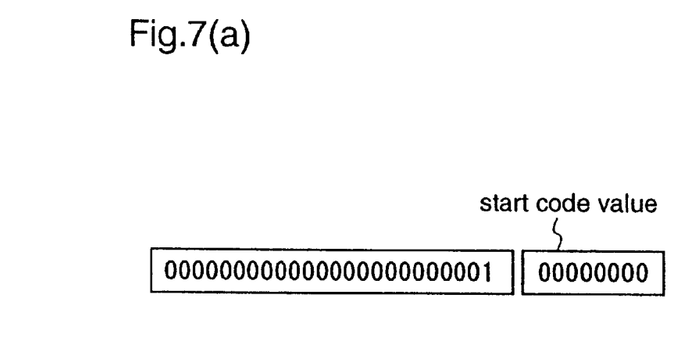
FIG. 7(a) is a diagram illustrating a structure of the synchronizing word.
Figure 7B:
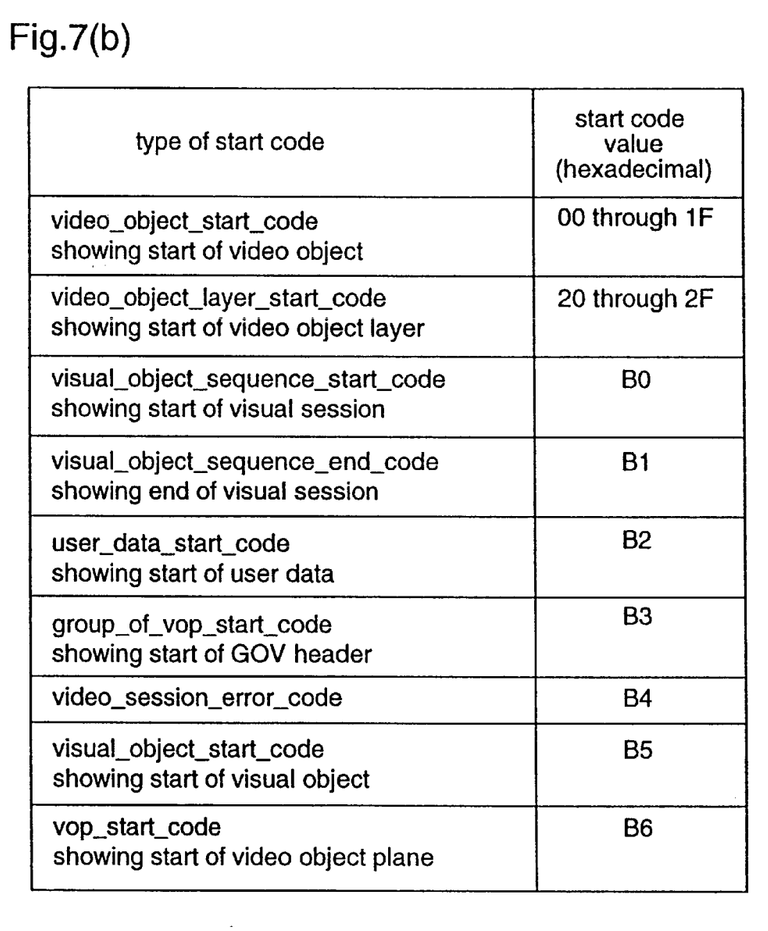
FIG. 7(b) is a diagram illustrating an example of a start code value of the synchronizing word.

In the image compression bit stream according to the MPEG standard (the details which are described in "Textbook of Recent MPEG" (ASCII) edited by Hiroshi Fujiwara, "All of MPEG-4" (Kogyo chosakai) written and edited by Sukeichi Miki, and the like are avoided), in order to identify a start position of information such as a screen and a type of data included in the bit stream after the start position, a fixed length code having a specific bit pattern (hereinafter, referred to as a start code) is inserted. When compressed image information is decoded, this start code is detected, and decoding processing is performed on the basis of the following information (hereinafter, referred to as "start code value"). In a structure of the start code, as shown in FIG. 7(a), an 8-bit start code value is added to 23 pieces of "0" and a single piece of "1", 24 bits in total. Taking MPEG4 (Moving Picture Experts Group 4) as an example, the standardized start codes are as shown in FIG. 7(b).

Figure 6:
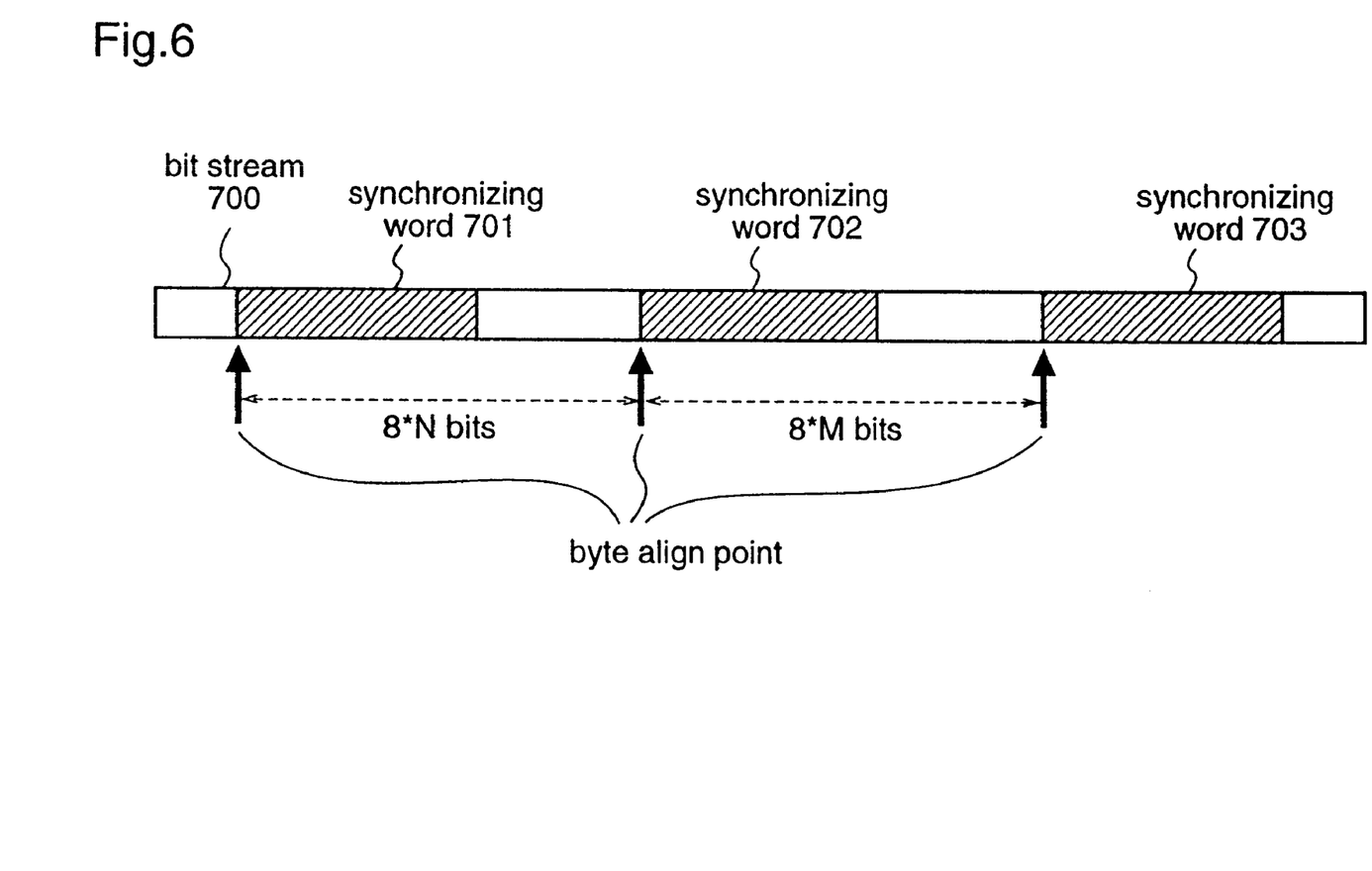
FIG. 6 is a diagram showing the synchronizing word which is byte-aligned in a bit stream.

The following measure is taken so as to enable to clearly distinguish the start codes from the other data. Bit patterns which are difficult to appear in the other data are adopted. Further, in the process of encoding the image information, the same bit pattern as that of the start code sometimes results in depending on the combination of the code words. However, in order to avoid an emulation due thereto, in an encoder, a 1-bit bit stream is inserted in the code word which has possibility to be emulated. Further, synchronizing words such as a start code and a sync marker are arranged such that each distance between the heads of synchronizing words becomes a positive integral multiplication of 8 as shown in FIG. 6.

When a conventional code detecting apparatus detects the synchronizing words as described above, the apparatus detects whether a bit stream having a certain bit length coincides with a pattern of the synchronizing word employing a shift register of 1 bit/cycle or 8 bits/cycle, for example, whether the bit sequence of 32 bits from the head of a shift register coincides with the pattern of the synchronizing word.

There is a case where an overlap is generated between image compression information (fixed length code, variable-length code) in the bit stream and the synchronizing word due to transmission errors and the like coming from the worsening of a communication state.

Figure 4A:
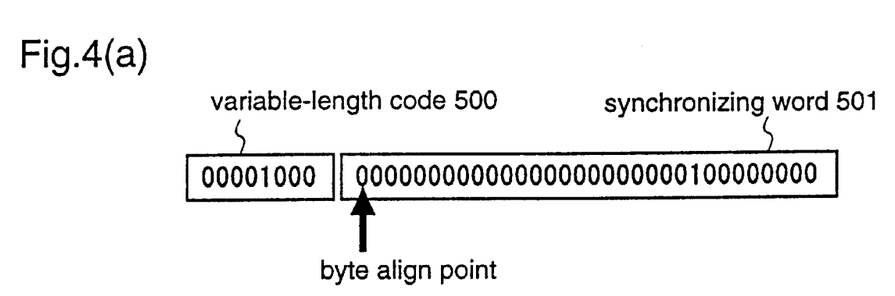
FIG. 4(a) is a diagram showing a normal bit stream.
Figure 4B:
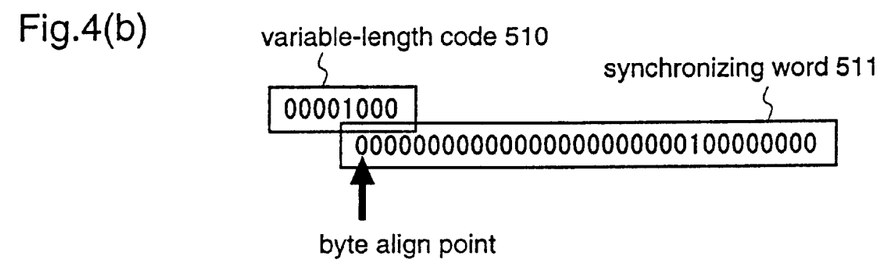
FIG. 4(b) is a diagram showing a bit stream in a state where an overlap is generated in a variable-length code and a synchronizing word.

As an example, a state where the overlap is generated between a variable-length code and the synchronizing word will be described with reference to the drawings. Initially, FIG. 4(a) shows a normal bit stream in which the overlap is not generated. A 32-bit synchronizing word 501 follows a variable-length code 500. On the other hand, FIG. 4(b) shows a bit stream in which the overlap is generated. The 3-bit data from the least significant bit of a variable-length code 510 and 3 bits from the most significant bit of the following 32-bit synchronizing word 511 overlap with each other. The state as shown in FIG. 4(b) is detected, and further the synchronizing word following the variable-length code is detected, resulting in an efficiency improvement of an image decoding processing and suppressing an image deterioration of a decoded image.

However, in the conventional synchronizing word detecting apparatuses, there are some in which the synchronizing word cannot be detected when the overlap is generated between the bit stream and the synchronizing word in the image compression information (fixed length code, variable-length code). In addition, there are some in which even if the synchronizing word can be detected, the state where the image compression information and the synchronizing word overlap with each other cannot be detected.

The synchronizing word is important information which shows the following image decoding processing. Therefore, non-detection or erroneous detection of the synchronizing word has a strong possibility of affecting the following image decoding processing, and causes an efficiency lowering of the image decoding processing and deteriorating the quality of the decoded image. In addition, such an error that the variable-length code and the synchronizing word overlap with each other cannot be detected. Therefore, there is a case where, when, actually, the image decoding processing should be interrupted immediately after error detection, the processing is kept as it is, thereby generating an erroneous decoded image and deteriorating the quality of an output image.

Furthermore, in the conventional synchronizing word detecting apparatus, searching for the synchronizing word is performed with the data being abandoned, and the above-described processing is kept until the synchronizing word is detected. Therefore, it is impossible for the apparatus to identify whether the synchronizing word exists in the most neighboring byte align point.

SUMMARY OF THE INVENTION

The present invention is made to solve the above-described problems, and it has for its object to provide a variable-length encoding and decoding apparatus which, when the overlap is generated in the image compression information and the synchronizing word, can detect the synchronizing word and can detect an error that the image compression information and the synchronizing word overlap with each other, and further can efficiently identify the presence of the synchronizing word in the most neighboring byte align point.

In order to solve the problems, according to a 1st aspect of the present invention, there is provided a variable-length encoding and decoding apparatus comprising: a register which stores a bit stream of video compression information from an external apparatus; a first shift register which shifts a signal to the high-order direction by n bytes per a machine cycle; first selection means for selecting a vacant section of a successive predetermined bit number in a predetermined section from the least significant bit of the first shift register, and successively storing a signal of the first shift register from the high-order side of the vacant section of the first shift register; a second shift register which shifts the signal to the high-order direction by the optional bit number per a machine cycle; second selection means for selecting a vacant section of the successive predetermined bit number in a predetermined section from the least significant bit of the second shift register, and successively storing a signal of the second shift register from the high-order side of the vacant section of the second shift register; third selection means for selecting a signal of the successive predetermined bit number in the second shift register; variable-length encoding and decoding means for performing decoding and simultaneously outputting code length information which shows a code length of a variable-length code in the case where a signal selected by the third selection means is a variable-length code and can be decoded; fourth selection means for selecting a signal of the successive predetermined bit number from the first shift register to output the same while decoding processing of the variable-length code is performed by the variable-length encoding and decoding means, and outputting a signal input from the third selection means when the decoding processing is completed; synchronizing word detecting means having first code detecting means for comparing the signal of the first shift register selected by the fourth selection means with a specific bit pattern to perform coincidence detection, and second code detecting means for comparing the signal of the second shift register selected by the fourth selection means with the specific bit pattern to perform coincidence detection; specific bit pattern position information management means which, when a signal of the specific bit pattern in the first shift register is detected by the first code detecting means and a signal of the most significant bit of the specific bit code is moved to the second shift register, sets a head bit position information of the specific bit pattern in the second shift register at that timing, and, when shift processing is generated in the second shift register, updates the head bit position information in accordance with the shift amount; overlap detecting means which judges whether or not an overlap is generated between the variable-length code and the specific bit pattern in the second shift register, on the basis of code length information of the variable-length code from the variable-length encoding and decoding means and the head bit position information of the specific bit pattern from the specific bit pattern position information management means and, when the overlap is detected, outputs an overlap notifying signal.

Thereby, the overlap can be detected with high precision, and the quality of the decoded image from image compression information can be enhanced.

According to a 2nd aspect of the present invention, in the variable-length encoding and decoding apparatus of the 1st aspect, the specific bit pattern position information management means comprises a plurality of storage means for storing each head bit position information of plural specific bit patterns in the second shift register, and the overlap detecting means judges whether or not the overlap of the variable-length code and the specific bit pattern is generated in the second shift register by using the head bit position information closest to the most significant bit or all the head bit position information of the second shift register among the plurality of the head bit position information stored in the plurality of the storage means.

Thereby, even when the head bits of two synchronizing words exist in the second shift register, the overlap between both the two synchronizing words and the variable-length code can be detected.

According to a 3rd aspect of the present invention, in the variable-length encoding and decoding apparatus of the 2nd aspect, the specific bit pattern position information management means initializes the head bit position information of the plurality of the storage means in the case where the head of the specific bit pattern does not exist in the second shift register, and, each time when the signal of the specific bit pattern is detected by the first code detecting means, selects one in which the head bit position information has an initial value among the plurality of the storage means thereby to set the head bit position information.

Thereby, overwriting in the head bit position information which is already stored in any of the storage means when the synchronizing word is detected can be avoided.

According to a 4th aspect of the present invention, in the variable-length encoding and decoding apparatus of any of the 1st through 3rd aspects, when the corresponding code does not exist in a lookup table of the variable-length code while the variable-length encoding and decoding means decodes the variable-length code signal selected by the third selection means, the variable-length encoding and decoding means outputs a maximum code length of the variable-length code in the lookup table to the overlap detecting means.

Thereby, even when an error is generated in decoding processing of the variable-length code, the overlap of the synchronizing word and the variable-length code can be detected, and the overlap detection with high precision can be realized.

According to a 5th aspect of the present invention, in the variable-length encoding and decoding apparatus of any of the 1st through 3rd aspects, when the corresponding code does not exist in the lookup table of the variable-length code while the variable-length encoding and decoding means decodes the variable-length code signal selected by the third selection means, the variable-length encoding and decoding means outputs a value which is obtained by adding 1 to the number of bits which coincides successively from the respective most significant bits in the selected variable-length code and the variable-length code in the lookup table to the overlap detecting means.

Thereby, even when an error is generated in decoding processing of the variable-length code, the overlap of the synchronizing word and the variable-length code can be prevented from being erroneously detected, and the overlap detection with higher precision can be realized.

According to a 6th aspect of the present invention, the variable-length encoding and decoding apparatus of any of the 1st through 5th aspects comprises: byte align point management means which, when the specific bit pattern in the second shift register is detected by the second code detecting means, at that timing, initializes a byte align point of the bit stream and, when shift processing is generated in the second shift register, updates the byte align point in accordance with the shift amount.

Thereby, the data is shifted by the second shift register at the time when the next synchronizing word is searched so that the byte align point becomes the most significant bit, thereby detecting the synchronizing word by the second code detecting means, and the erroneous detection due to such as the emulation of the synchronizing word can be prevented.

According to a 7th aspect of the present invention, the variable-length encoding and decoding apparatus of any of the 1st through 6th aspects comprises: second synchronizing word detecting means which regards the most neighboring byte align point from the most significant bit of the second shift register as a reference point, in accordance with byte align point information of the byte align point management means, and compares the signal of the successive predetermined bit number with the specific bit pattern thereby to perform coincidence detection.

Thereby, the detection of the synchronizing word can be performed for each byte align point, and efficient synchronizing word detection and image decoding processing can be performed.

DETAILED DESCRIPTION OF THE PREFERRED EMBODIMENTS

Hereinafter, embodiments of the present invention will be described with reference to the drawings. The embodiments shown here are just an example and the present invention is not limited to the embodiments.

Embodiment 1

Hereinafter, a variable-length encoding and decoding apparatus according to a first embodiment will be described. Further, the variable-length encoding and decoding apparatus of the present invention has a variable-length encoding and decoding mode, a synchronizing word detection mode, and a mode for regarding the most neighboring byte align point as a reference point and detecting the synchronizing word. In this first embodiment, the variable-length encoding and decoding mode will be mainly described, and the other modes will be described later.

Figure 1:
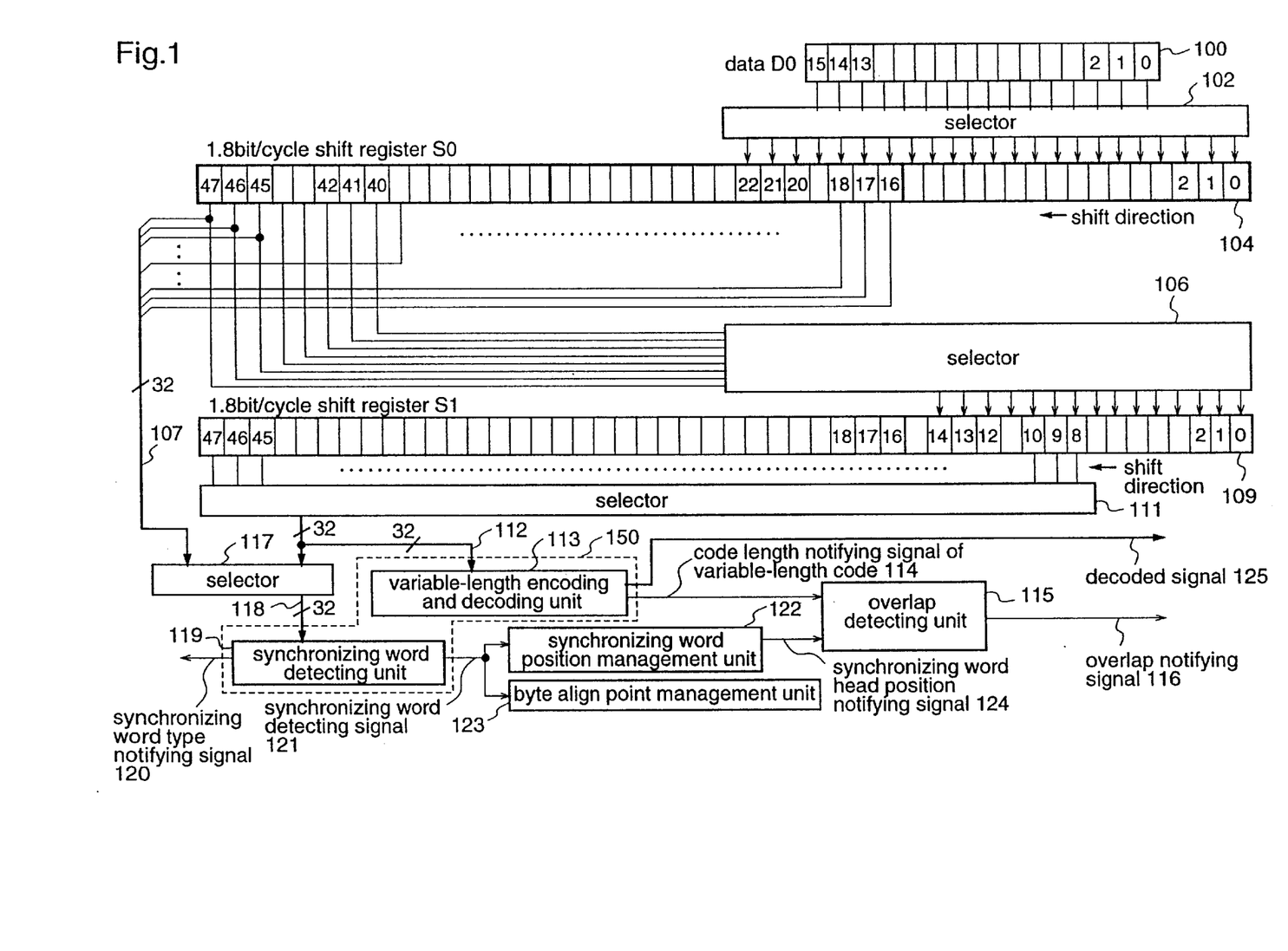
FIG. 1 is a diagram illustrating a structure of a variable-length encoding and decoding apparatus according to a first embodiment of the present invention.

FIG. 1 is a structural diagram of the variable-length encoding and decoding apparatus according to the first embodiment.

Initially, a structure and an operation of a part where shift processing of a bit stream is performed will be described.

Registers of a register 100, a first register 104, and a second shift register 109 are numbered serially in order from the least significant bit so as to clarify a bit position. A register length of these registers and shift processing when data shift processing is performed is not limited to the following values.

The register 100 stores a bit stream of video compression information from an external apparatus. Here, it is assumed that registers store the 16-bit bit stream.

The first shift register 104 shifts a signal to the high-order direction by n bytes per a machine cycle. Here, it is assumed that the shift register is the 48-bit shift register which performs 8-bit shift per a machine cycle.

A first selector 102 selects a vacant section of the successive predetermined bit number in a predetermined section from the least significant bit of the first shift register 104, and successively stores a signal of the first register from the high-order side of the vacant section of the first shift register 104. Here, it is assumed that an optional successive 16-bit section in a [22:0] section of the first shift register 104 is selected, and a signal which is input from [15:0] of the register 100 is stored in the section. However, the first selector 102 selects the most significant side in successive 16-bit sections where efficient data is not stored in the [22:0] section of the first shift register 104 to store the data close to the high-order side of a vacant part within this [22:0] section. Opposite, when there is no 16-bit vacancy within the [22:0] section, the data is not stored.

The second shift register 109 shifts a signal to the high-order direction by the optional bit number per a machine cycle. Here, it is assumed that the shift register is the 48-bit shift register.

The second selector 106 selects the vacant section of the successive predetermined bit number within the predetermined section from the least significant bit of the second shift register 109 to successively store a signal of the first shift register 104 from the high-order side of the vacant section of the second shift register 109.

For example, when an operation mode of the second shift register 109 has an 8-bit shift per a machine cycle, the second selector 106 selects an optional successive 8-bit section within a [14:0] section of the second shift register 109 to store an 8-bit signal which is input from [47:40] of the first shift register 104 in the section. However, the second selector 106 selects the most significant side in successive 8-bit sections where the efficient data is not stored within the [14:0] section of the second shift register 109 to store data close to the high-order side of a vacant part within this [14:0] section. Oppositely, when there is no successive 8-bit vacancy within the [14:0] section, the data is not stored.

In addition, when the operation mode of the second shift register 109 has one bit shift per a machine cycle, the second selector 106 selects [0:0] of the second shift register 109 to store the signal which is input from [47:47] of the first shift register 104 in the section. Oppositely, when there is no vacancy in [0:0] of the second shift register 109, the data is not stored.

As a whole operation, initially, the first selector 102 evaluates the successive vacant bit number in [22:0] of the first shift register 104 by comparing the same with 16. When the successive vacant bit number is 16 or more, the 16 bit data of the register 100 is stored in a vacant section in [22:0] of the first shift register 104, and updating is performed by adding −16 to the vacant bit number of the first shift register 104. Thereafter, a 16-bit new bit stream is supplemented from an external storage apparatus (not shown) in the register 100.

Next, the second selector 106 evaluates the vacant bit number on the low-order side of the second shift register 109 by comparing the same with the shift amount sft of 1 bit/8 bit of the second shift register 109. When the successive vacant bit number is sft or more, the data which is stored in [47:48−sft] of the first shift register 104 is stored in the vacant section on the low-order side of the second shift register 109, and updating is performed by adding (−sft) to the vacant bit number of the second shift register 109. Thereafter, the data is shifted to the high-order direction by sft bits in the first shift register 104, and sft is added to the vacant bit number of the first shift register 104.

In this way, in the variable length encoding and decoding apparatus of the present invention, while shift processing of the image compression bit stream which is input from the external apparatus is being performed, data synchronizing word detection and decoding processing of the variable-length code are performed.

Next, a structure and an operation of a part where data synchronizing word detection and decoding processing of the variable-length code are performed will be described.

A third selector 111 selects a signal of the successive predetermined bit number in the second shift register 109. Here, the successive 32-bit data is selected within a [47:8] section of the second shift register 109 to be output.

A fourth selector 117 selects a signal of the successive predetermined bit number from the first shift register 104 and outputs the same while decoding processing of the variable-length code is performed by a variable-length encoding and decoding unit 113. After decoding processing is completed, the signal which is input from the third selector 111 is output. Here, the fourth selector 117 selects either a signal 107 of the 32-bit data which is input from [47:16] of the first shift register 104 or a signal 112 of the 32-bit data which is input from the third selector 111, and outputs the same. Further, in the variable-length encoding and decoding mode, the signal 107 is selected by the fourth selector 117. In a synchronizing word search mode and a mode for regarding the most neighboring byte align point as a reference point and detecting the synchronizing word, a signal 112 is selected.

The synchronizing word detecting unit 119 has first code detecting means for comparing a signal of the first shift register 104 selected by the fourth selector 117 with the specific bit pattern to perform coincidence detection, and second code detecting means for comparing a signal of the second shift register 109 selected by the fourth selector 117 with the specific bit pattern to perform coincidence detection. The synchronizing word detecting unit 119 performs the detection of the synchronizing word from the 32-bit data selected by the fourth selector 117 and, when the synchronizing word is detected, outputs a synchronizing word detecting signal 121 which notifies the detection result, and a synchronizing word type notifying signal 120 showing a type of the synchronizing word.

When a signal selected by the third selector 111 is a variable-length code as well as can be decoded, the variable-length encoding and decoding unit 113 performs decoding processing of the code which is obtained as an index of a variable-length code table from output data 112 of the third selector 111 to output as a decoded signal 125 and simultaneously outputs code length information showing a code length of the variable-length code, that is, a code length notifying signal 114. Further, when a code corresponding to the signal 112 which is received from the third selector 111 does not exist in the variable-length code table, the variable-length code decoding unit 113 may output a signal which shows decoding error and further a control signal for stopping the variable-length encoding and decoding apparatus itself to a CPU (not shown) which controls this apparatus.

When a signal of the specific bit pattern in the first shift register is detected by the first code detecting means and a signal of the most significant bit in the specific bit code is moved to the second shift register 109, at this point of time, a synchronizing word position management unit 122 sets head bit position information of the specific bit pattern within the second shift register 109. When shift processing is generated in the second shift register, the synchronizing word position management unit 122 updates the head bit position information in accordance with the shift amount. Here, the synchronizing word position management unit 122 manages the head bit position of the synchronizing word which exists in the second shift register 109, and outputs a synchronizing word head position notifying signal 124 which shows the head bit position information of the synchronizing word. In addition, the synchronizing word position management unit 122 receives the synchronizing word detecting signal 121 which is output from the synchronizing word detecting unit 119 to recognize that the synchronizing word is detected in the first shift register 104, and sets a synchronizing word head pointer which shows the head bit position of the synchronizing word within the second shift register 109 at the timing that the head of the synchronizing word which exists in the first shift register 104 is moved to the second shift register 109. At this time, the synchronizing word position management unit 122 sets the vacant bit number of the second shift register 109 as the synchronizing word head pointer. Further, the synchronizing word position management unit 122 has a function for reflecting the shift amount, such that, each time when the second shift register 109 performs shift processing, for example, updating is performed by adding the shift amount to the synchronizing word head pointer.

A byte align point management unit 123 manages position information of the most neighboring byte align point from the most significant bit of the second shift register 109. Further, in the synchronizing word search mode which will be described in a second embodiment, the byte align point management unit 123 has a function for reflecting the shift amount, such that, when the synchronizing word is detected from the second shift register 109 by the synchronizing word detecting unit 119, at that timing, the byte align point management unit 123 initializes the byte align point to 0, and each time when the second shift register 109 performs shift processing, for example, the unit 123 adds the shift amount to the byte align point to update the result of 3 bits from the least significant bit of the addition result to a new byte align point.

An overlap detecting unit 115 judges whether or not an overlap is generated between the variable-length code and the specific bit pattern in the second shift register 109 on the basis of the code length information of the variable-length code from the variable-length encoding and decoding unit 113 and the head bit position information of the specific bit pattern from the synchronizing word position management unit 122, and, when the overlap is detected, outputs an overlap notifying signal 116. The detection of the overlap is judged by a code length notifying signal 114 from the variable-length encoding and decoding unit 113 and the synchronizing word head position notifying signal 124 from the synchronizing word position management unit 122. When an overlap generation is detected, the control signal for stopping the variable-length encoding and decoding apparatus itself may be output to the CPU (not shown) which controls this apparatus.

Figure 2:
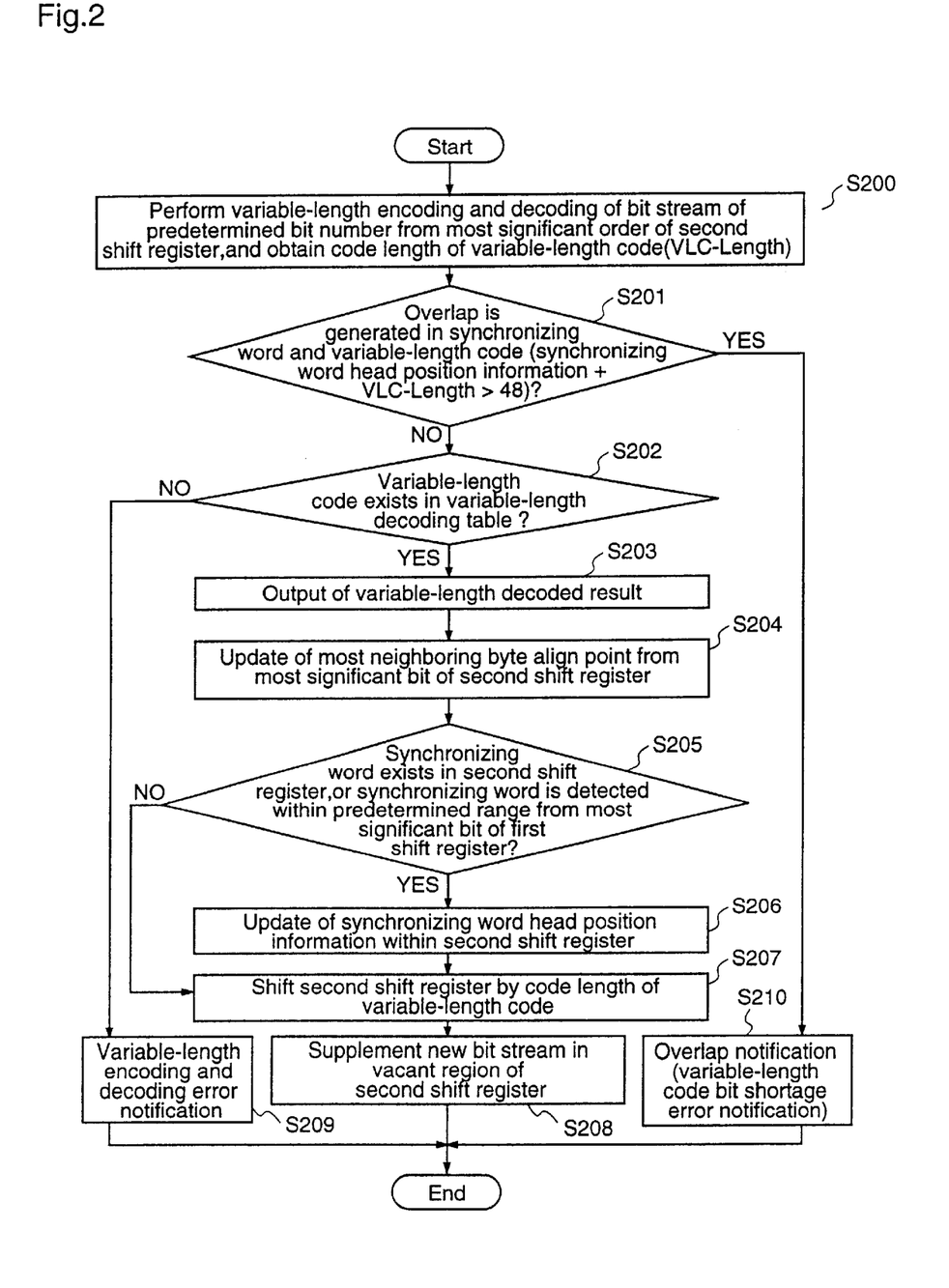
FIG. 2 is a flowchart showing an operation at the time of a variable-length encoding and decoding mode of the variable-length encoding and decoding apparatus according to the first embodiment of the present invention.

Next, a processing flow of the variable-length encoding and decoding mode in the first embodiment of the present invention will be described with reference to FIG. 2.

The variable-length encoding and decoding unit 113 decodes the variable-length code signal which is input from the third selector 111, obtains a code length VLC_Length of the variable length code, and outputs the code length notifying signal 114 (step S200).

The overlap detecting unit 115 adds VLC_Length to the synchronizing word head pointer which exists in the second shift register 109 to evaluate the value (step S201). When {(synchronizing word head pointer)+VLC_Length} is 48 or less, the overlap detecting unit 115 judges that the overlap is not generated between the variable-length code and the synchronizing word, and the step is switched to step S202. When {(synchronizing word head pointer)+sft} is more than 48, the overlap detecting unit 115 judges that the overlap is generated between the variable-length code and the synchronizing word, that is, variable-length code bits are lacking, to output the overlap notifying signal (step S210), and immediately concludes processing.

In step S202, when the variable-length code which is input from the third selector 111 does not exist in the variable-length decoding table, the variable-length encoding and decoding unit 113 outputs a variable-length encoding and decoding error notifying signal (step S209). When the variable-length code exists in the variable-length decoding table, the decoded signal 125 corresponding to the variable-length code is output (step S203).

The byte align point management unit 123 adds VLC_Length to the byte align point which is positioned in the most neighboring position from the most significant bit of the second shift register 109, and 3 bits from the least significant bit of the addition result is made a new byte align point (step S204).

The synchronizing word position management unit 122 judges whether the synchronizing word exists in the second shift register 209, or whether the synchronizing word in the first shift register 204 is detected by the synchronizing word detecting unit 119 so that the synchronizing word position management unit 122 receives the synchronizing word detecting signal 121 (step S205).

To be more specific, in step S205, the synchronizing word head pointer of the second shift register 109 is evaluated by comparing the same with 0. When the synchronizing word head pointer is not 0, it is judged that the synchronizing word exists in the second shift register 209, VLC_Length is added to the synchronizing word head pointer, and the synchronizing head pointer is updated (step S206). Further, in step S205, when the synchronizing word is detected from the first shift register 104 by the synchronizing word detecting unit 119 and the synchronizing word detecting signal 121 is received from the synchronizing word detecting unit 119, the vacant bit number on the low-order side of the second shift register 109 is set as the synchronizing word head pointer (step S206).

Oppositely, when the synchronizing word head pointer is 0 as well as the synchronizing word is not detected from the first shift register 104 by the synchronizing word detecting unit 119, it is judged that the head of the synchronizing word does not exist in the second shift register 109 so that updating of the synchronizing word head pointer is not performed, and the step is switched to step S207.

The second shift register 109 performs bit-shift by the code length of the variable length code, and adds VLC_Length to the vacant bit number of the second shift register 109 (step S207).

In step S208, a new bit stream is supplemented in the vacant region of the second shift register 109 from the first shift register 104.

Further, there is a case where at most two head bits of the 32-bit synchronizing word exist in the 48-bit second shift register 109. In the synchronizing word position management unit 122, two synchronizing word head pointers are provided, and two synchronizing word head positions are managed. The synchronizing word position management unit 122 selects information in the synchronizing word head position closest to the most significant order of the second shift register 109 of two synchronizing word head positions as synchronizing word head position information which is notified to the overlap detecting unit 115.

Further, the synchronizing word position management unit 122 comprises a plurality of storage means for storing each head bit position information for plural specific bit patterns in the second shift register 109. For example, there are provided two registers which store two pieces of synchronizing word head position information. The overlap detecting unit 115 judges whether or not the overlap of the variable-length code with the specific bit pattern is generated in the second shift register 109, by using the head bit position information closest to the most significant bit of the second shift register 109 or all the head bit position information among plural pieces of the head bit position information which are stored in the plurality of the storage means. When the head of the specific bit pattern does not exist in the second shift register, the overlap detecting unit 115 initializes the head bit position information of the plurality of the storage means. Each time when the signal of the specific bit pattern is detected by first code detecting means of the synchronizing word detecting unit 119, the overlap detecting unit 115 selects the storage means in which the head bit position information has an initial value of the plurality of the storage means to set the head bit position information, and the synchronizing word head bit is toggled from the first shift register 104 at the timing that the synchronizing word head bit is stored in the second shift register 109, thereby preventing the synchronizing word head position information which is already stored in the register from being overwritten and deleted by new synchronizing word head position information.

Figures 3A, 3B, 3C:
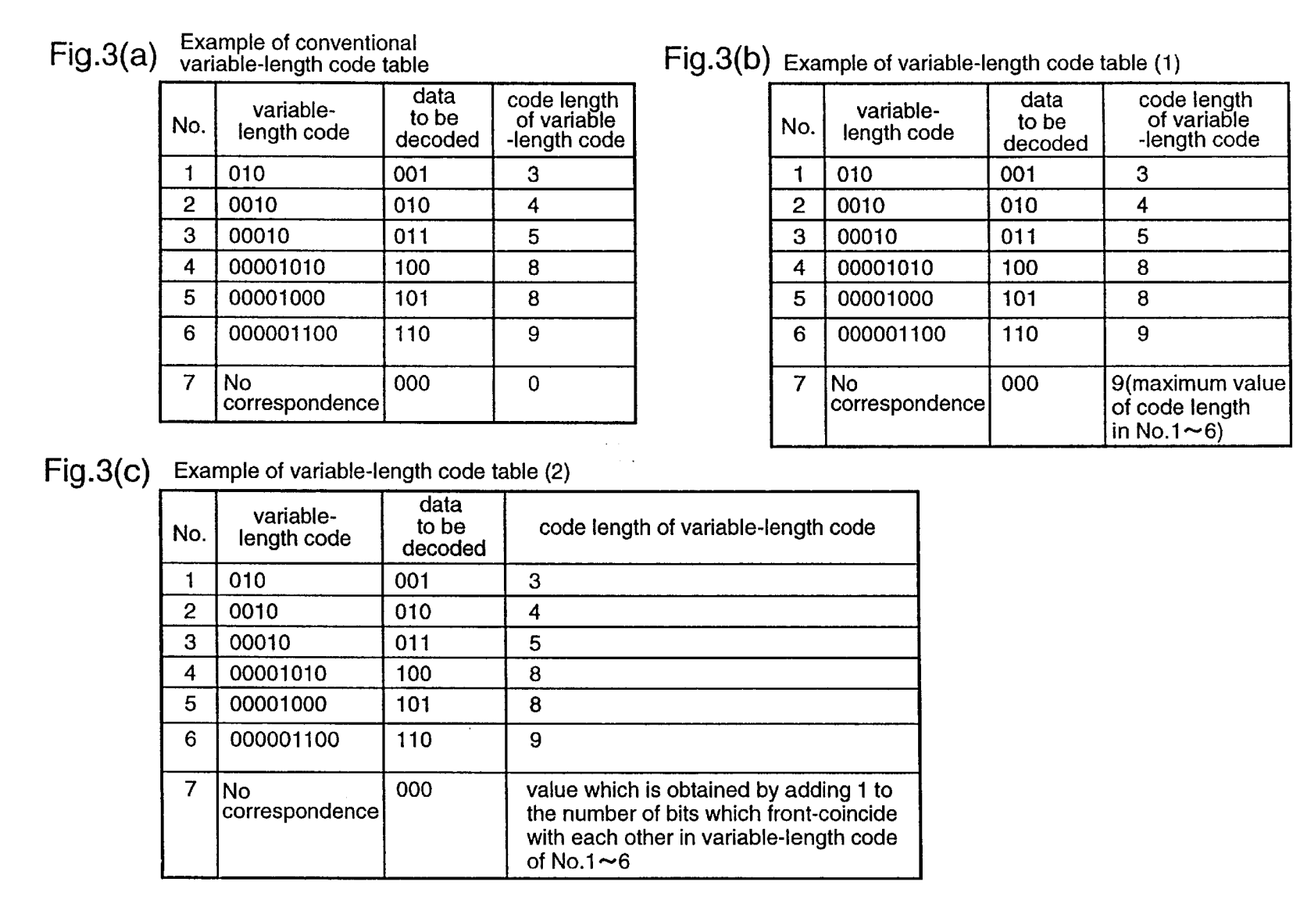
FIG. 3(a) is a diagram illustrating an example of a conventional variable-length code table.
FIG. 3(b) is a diagram illustrating example 1 of the variable-length code table of the present invention.
FIG. 3(c) is a diagram illustrating example 2 of the variable-length code table of the present invention.

Further, conventionally, the variable-length encoding and decoding unit 113 obtains the code length of the variable-length code VLC_Length from the variable-length code table as shown in FIG. 3(*a*). When an element corresponding to the signal 112 which is input from the third selector 111 does not exist in the variable-length code table, the variable-length encoding and decoding unit 113 judges that the code length has an error, and stops variable-length encoding and decoding processing. At this time, as the code length of the variable-length code VLC_Length, 0 bit is obtained as shown in No. 7 in FIG. 3(*a*) to be output. Therefore, the overlap detecting unit 115 cannot detect the overlap of the variable-length code with the synchronizing word.

Figure 5A:
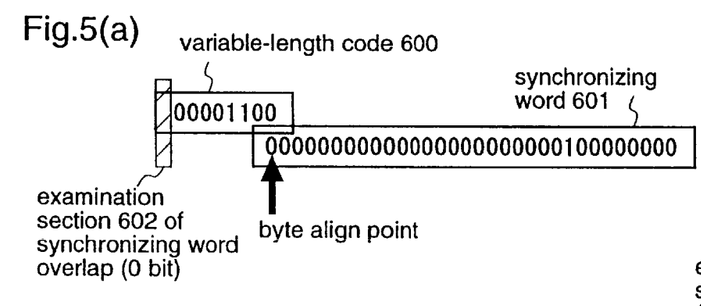
FIG. 5(a) is a diagram illustrating a bit stream in a state where the overlap is generated in the variable-length code and the synchronizing word at the time of the conventional decoding error.

More specifically, a description will be given with reference to the drawings. The overlap is generated between a variable-length code 600 and a synchronizing word 601 as shown in FIG. 5(*a*). However, an examination section length of the overlap is 0 bit. Therefore, the overlap detecting unit 115 cannot detect the overlap. However, there are some cases where, in order to improve efficiency of the image decoding processing or prevent the quality of the decoded image from deteriorating, it is necessary to identify whether or not the variable length code and the synchronizing word overlap with each other.

Figure 5B:
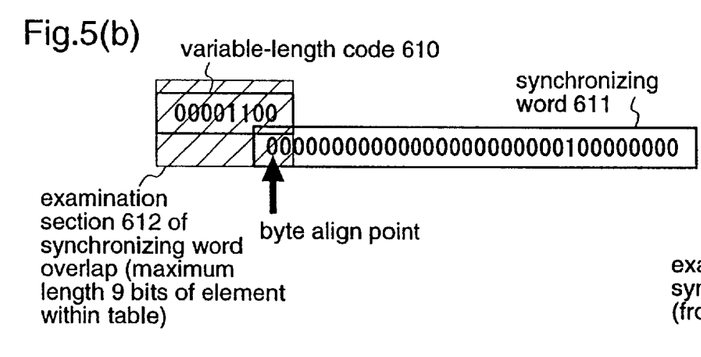
FIG. 5(b) is a diagram for explaining an operation when the overlap is detected, which is generated between the variable-length code and the synchronizing word at the time of decoding error in the first embodiment of the present invention.
Figure 5C:
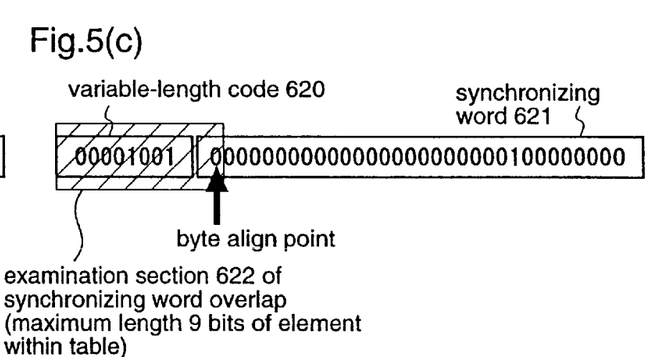
FIG. 5(c) is a diagram for explaining an operation when the overlap between the variable-length code and the synchronizing word which is generated at the time of decoding error is erroneously detected in the first embodiment of the present invention.

Here, even in the case where an error is generated in the variable-length encoding processing, and the corresponding element does not exist in the variable-length code table, for example, when there is no corresponding element in the variable-length code table, the variable-length encoding and decoding unit 113 outputs a maximum value 9 of the code length of the element within the table as the code length VLC_Length of the variable-length code, as shown in FIG. 3(*b*). Thereby, also in the case where the overlap is generated between the variable-length code 610 and the synchronizing word 611 as shown in FIG. 5(*b*), an examination section length 612 of the overlap has 9 bits, whereby the overlap detecting unit 115 can detect the overlap.

However, in the case described above, when the error is generated in the variable-length code 620, and the code has no corresponding element in the table as shown in FIG. 5(*c*), though the synchronizing word 621 follows without overlapping, the code length VLC_Length which is output by the variable-length encoding and decoding unit 113 is 9 bits so that the overlap detecting unit 115 judges that the overlap is generated by detecting the 9-bit section, thereby generating erroneous detection.

Figure 5D:
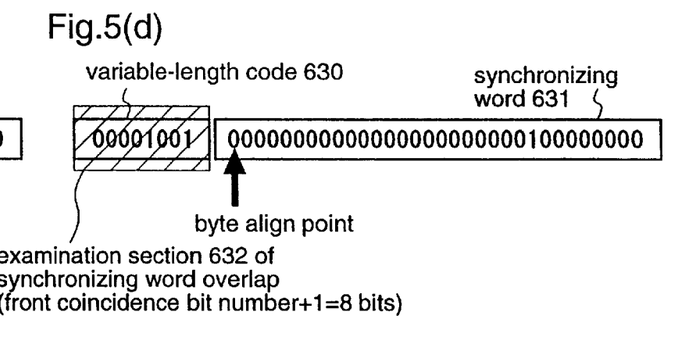
FIG. 5(d) is a diagram for explaining an operation for preventing the overlap between the variable-length code and the synchronizing word which is generated at the time of decoding error from being erroneously detected.

Here, as shown in FIG. 3(*c*), in the case where there is no corresponding element in the variable-length code table, the variable-length encoding and decoding unit 113 outputs the value which is obtained by adding 1 to the number of bits the front parts of which of the input variable-length code and the code in the table coincide with each other as the code length of the variable-length code VLC_Length. Thereby, also in the case where the error is generated in the variable-length code 630 as shown in FIG. 5(*d*), the examination section 632 of the overlap in the synchronizing word 631 and the variable length code 630 has 8 bits which are obtained by adding 1 bit to the number of bits 7 the front parts of which of the No. 5 code in the table and the variable length code 630 coincide with each other. The overlap detecting unit 115 examines this 8-bit section.

As described above, the variable-length encoding and decoding apparatus according to the first embodiment of the present invention detects the synchronizing word on the byte align point and always monitors the head position of the synchronizing word, as preprocessing of the variable-length encoding and decoding processing, in order to detect the overlap in the variable-length code and the synchronizing word. Further, when the corresponding code does not exist in a lookup table of the variable length code while the variable-length encoding and decoding means decodes the variable-length code signal which is selected by the third selector 111, the variable-length encoding and decoding means outputs the maximum code length of the variable-length code within the lookup table, or the value which is obtained by adding 1 to the number of bits which coincide successively from the most significant bits of the selected variable length code and the variable length code within the lookup table, to the overlap detecting unit 115. Therefore, the variable-length encoding and decoding apparatus can avoid the erroneous detection of the overlap between the variable-length code and the synchronizing word due to the variable-length code error, exactly detect the overlap by the position relationship of the code length of the variable-length code, and improve the quality of the decoded image of the image compression information. Further, even when the corresponding variable-length code does not exist in the lookup table which is used at the time of variable-length encoding and decoding, the variable-length encoding and decoding apparatus can avoid the erroneous detection of the overlap between the synchronizing word and the variable-length code only by changing the variable-length code table, without affecting the scale in the apparatus, and easily realize the overlap detection with high precision.

In addition, the synchronizing word position management unit 122 comprises two registers which store two pieces of the synchronizing word head position information, whereby, even if the head bits of two synchronizing words exist in the second shift register 109, the overlap between both two synchronizing words and the variable length code can be detected.

Embodiment 2

Hereinafter, a variable-length encoding and decoding apparatus according to a second embodiment of the present invention will be described. Further, the synchronizing word search mode which is conventionally performed, and the mode for regarding the most neighboring byte align point from the most significant bit of the second shift register as a reference point and detecting the synchronizing word will be described.

Figure 8:
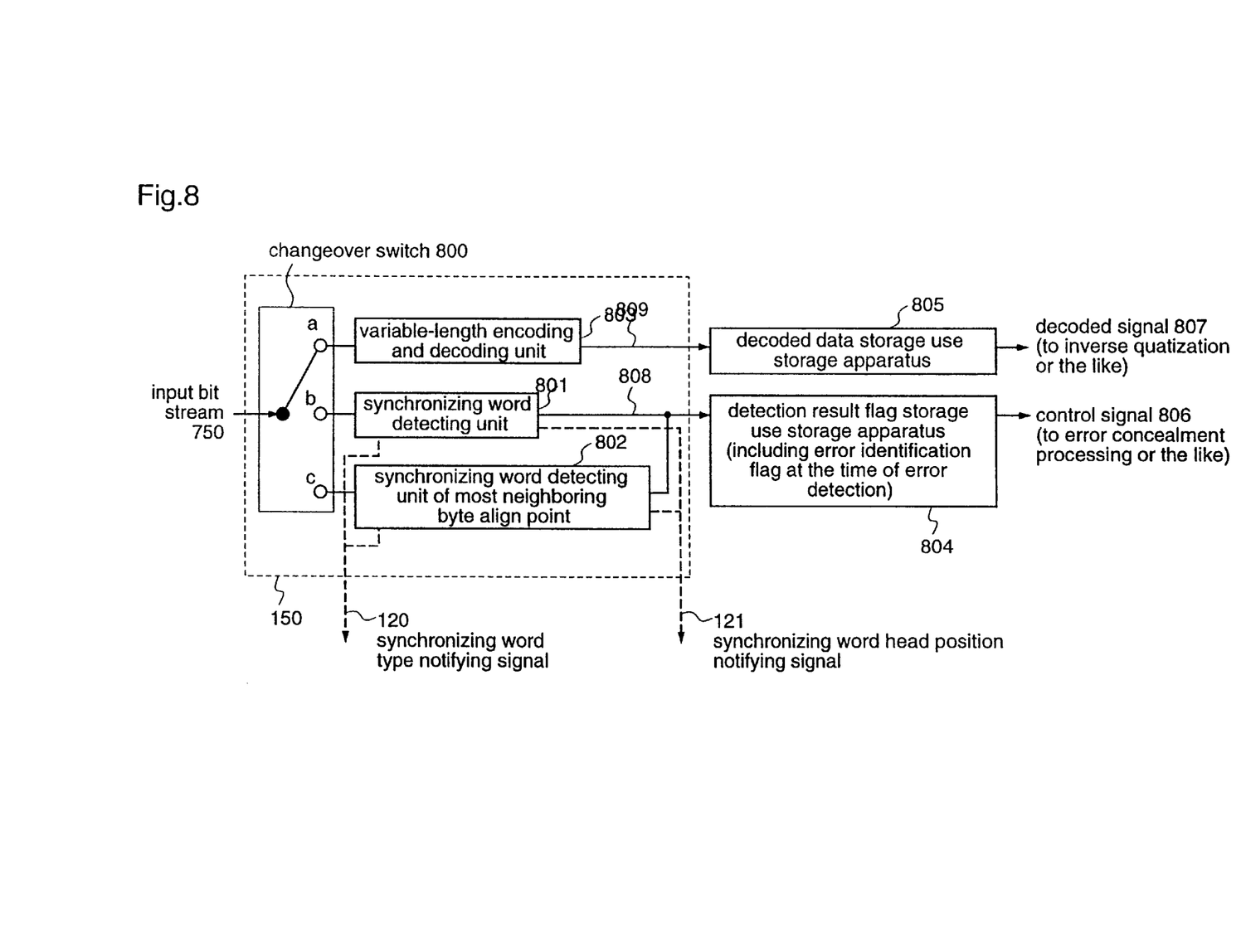
FIG. 8 is a diagram illustrating a partial structure of a variable-length encoding and decoding apparatus according to a second embodiment of the present invention.

FIG. 8 is a diagram illustrating a structure of the synchronizing word detecting unit and the variable-length encoding and decoding unit in the variable-length encoding and decoding apparatus according to this second embodiment. In the figure, the same numerals are used with respect to components which are identical or corresponding to those in FIG. 1. The explanation thereof is omitted.

A first synchronizing word detecting unit 801 regards the most significant bit of the second shift register as the reference point and detects the synchronizing word of the successive 32-bit data.

A synchronizing word detecting unit 802 on the most neighboring byte align point (hereinafter, referred to as a second synchronizing word detecting unit) regards the most neighboring byte align point from the most significant bit of the second shift register 109 as the reference point and detects the synchronizing word of the successive 32-bit data.

A structure and an operation of a variable-length encoding and decoding unit 803 is similar to the variable-length encoding and decoding unit 113 according to the first embodiment, and therefore the explanation thereof is omitted.

A changeover switch 800 outputs bit stream data 750 which is input from the first and second shift registers 104 and 109 through the third and fourth selectors 111 and 117 to either the first synchronizing word detecting unit 801, the second synchronizing word detecting unit 802, or the variable-length encoding and decoding unit 803.

A decoded data storage use storage apparatus 805 stores decoded data 809 which is output from the variable-length encoding and decoding unit 803 to output as a decoded signal 807 to inverse quantization means or the like.

A detection result flag storage use storage apparatus 804 stores a detection result flag 808 which is output from the synchronizing word detecting unit 801 and the second synchronizing word detecting unit 802, and outputs the same as the control signal 806 to error concealment processing or the like. Further, the detection result flag includes an error identification flag at the time of error detection.

Figure 9:
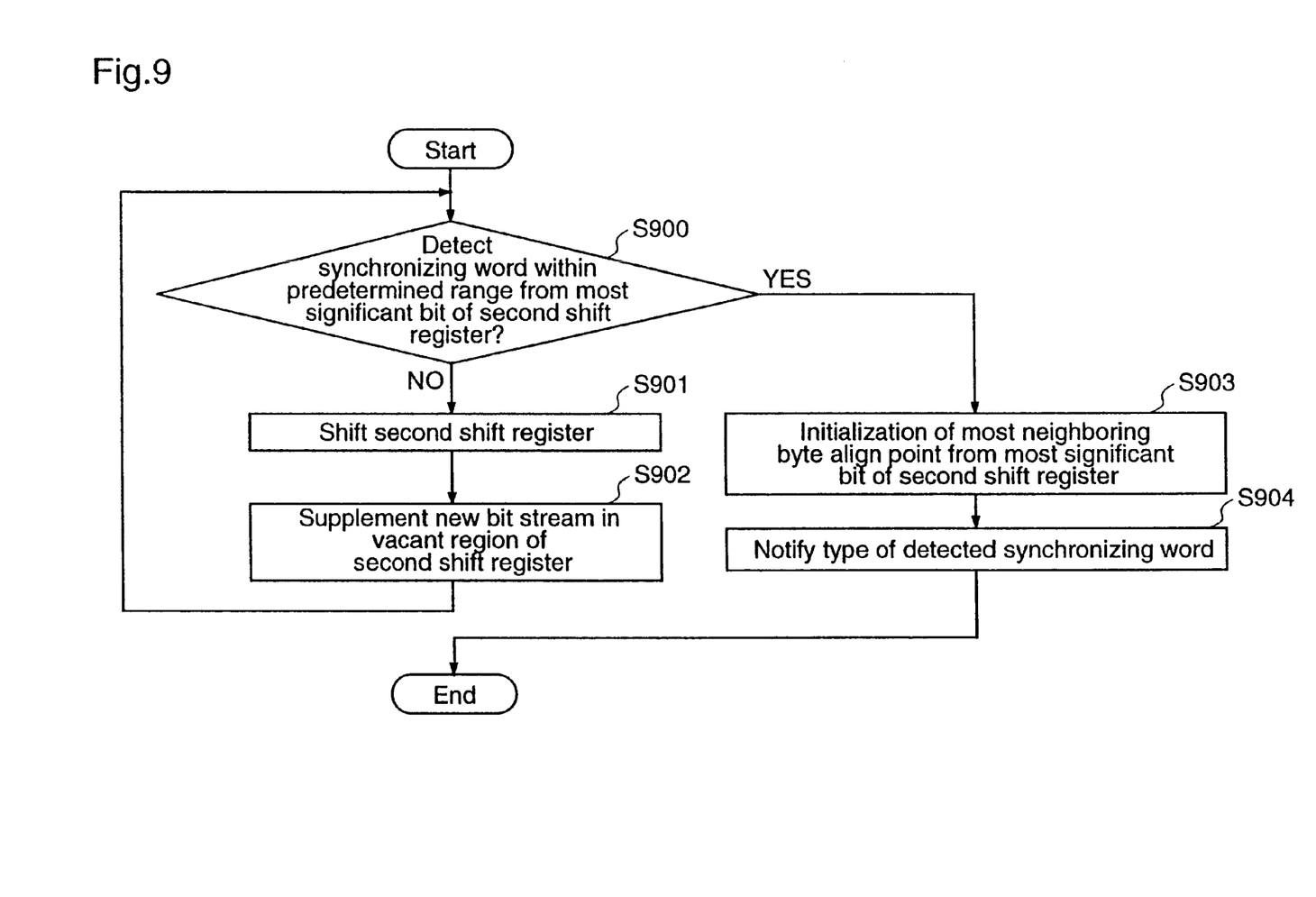
FIG. 9 is a flowchart showing an operation at the synchronizing word search mode of the variable-length encoding and decoding apparatus according to the second embodiment of the present invention.

Next, an operation in the case of the synchronizing word search mode in the variable-length encoding and decoding apparatus having the structure will be described with reference to FIG. 9.

The first synchronizing word detecting unit 801 judges the synchronizing word of the 32-bit data which is input from the second shift register 109 through the third selector 111 and the fourth selector 117 (step S900). When the synchronizing word is not detected by the first synchronizing word detecting unit 801, shift processing of the second shift register 109 is performed until the synchronizing word is detected (step S901), and simultaneously the data is supplemented in the vacant region of the second shift register 109 (step S902).

The first synchronizing word detecting unit 801 outputs the synchronizing word detecting signal 121 in the case where the synchronizing word is detected. The byte align point management unit 123 receives the synchronizing word detecting signal 121 from the first synchronizing word detecting unit 801, and initializes the most neighboring byte align point from the most significant bit of the second shift register 109 to 0 (step S903). Simultaneously, the first synchronizing word detecting unit 801 outputs the synchronizing word type notifying signal 120 which notifies a type of the detected synchronizing word (step S904).

In the case of the conventional synchronizing word search mode, while data is being abandoned, the synchronizing word is searched for, and further the process is kept until the synchronizing word is detected. Therefore, it is impossible to identify that the synchronizing word exists in the most neighboring byte align point. However, there is provided the second synchronizing word detecting unit 802, thereby regarding the most neighboring byte align point from the most significant bit of the second shift register 109 as the reference point and detecting the synchronizing word.

Figure 10:
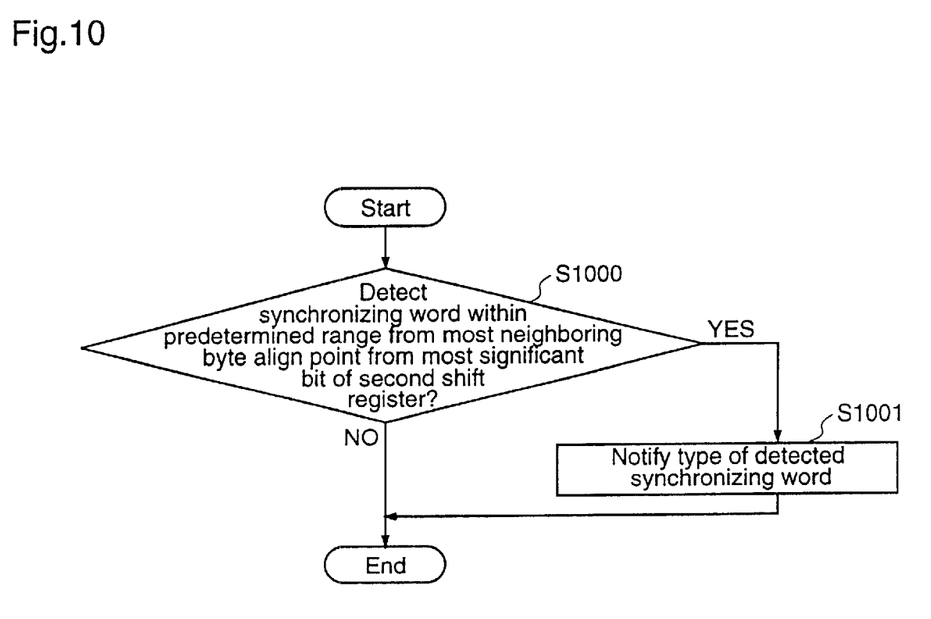
FIG. 10 is a flowchart showing an operation at the synchronizing word search mode searching the most neighboring byte align point according to the second embodiment of the present invention.

Hereinafter, a description will be given of an operation of the variable length encoding and decoding apparatus at the time of the mode for regarding the most neighboring byte align point as the reference point and detecting the synchronizing word with reference to FIG. 10.

The byte align point management unit 123 regards the byte align point found by the synchronizing word search mode as a reference and thereafter updates the byte align point with shift processing of the second shift register 109.

When the most neighboring byte align point from the most significant bit of the second shift register 109 is regarded as the reference point, and the synchronizing word detection is performed, initially, the third selector 111 regards the byte align point which is positioned in the most neighboring position from the most significant bit of the second shift register 109 as the reference point to select the data in the successive 32-bit section, and outputs the signal 112. The fourth selector 117 receives the signal 112 which is output from the third selector 111 to output to the second synchronizing word detecting unit 802.

The second synchronizing word detecting unit 802 detects the synchronizing word of the signal 112 (step S1000). When the synchronizing word is detected, the second synchronizing word detecting unit 802 outputs the synchronizing word type notifying signal 120 which shows a type of the synchronizing word (step S1001). When the synchronizing word is detected, the detection processing is concluded.

In this way, when the synchronizing word in the bit stream is detected, as compared with the conventional apparatus in which the first synchronizing word detecting unit 801 searches for the synchronizing word while abandoning data, in the present invention, data shift for the synchronizing word detection is not performed in the second shift register 109. The second synchronizing word detecting unit 802 once refers to the 32-bit data in which the most neighboring byte align point from the most significant order of the second shift register 109 is the reference point, thereby judging the synchronizing word detection.

In addition, the data is shifted by the second shift register 109 such that the byte align point becomes the most significant bit, on the basis of byte align point information which is obtained at the time of the synchronizing word search mode, whereby the first synchronizing word detecting unit 801 can detect the synchronizing word of the 32-bit data in which the most significant bit of the second shift register 109 is the reference point, and the erroneous detection of the synchronizing word due to the emulation of the synchronizing word or the like can be prevented.

As described above, the variable-length encoding and decoding apparatus according to the second embodiment of the present invention identifies whether the synchronizing word exists in the most neighboring byte align point from the most significant bit of the second shift register 109 on the basis of byte align point information which is obtained at the time of the normal synchronizing word search mode. The data is shifted by the second shift register 109 so that the byte align point becomes the most significant bit. The synchronizing word on the byte align point is detected by the first synchronizing word detecting unit 801. Therefore, the synchronizing words for each byte align point are detected, thereby preventing erroneous detection of the synchronizing word due to the emulation of the synchronizing word or the like.

What is claimed is:

1. A variable-length encoding and decoding apparatus comprising:

a register which stores a bit stream of video compression information from an external apparatus;

a first shift register which shifts a signal to the high-order direction by n bytes per a machine cycle;

first selection means for selecting a vacant section of a successive predetermined bit number in a predetermined section from the least significant bit of the first shift register, and successively storing a signal of the first register from the high-order side of the vacant section of the first shift register;

a second shift register which shifts the signal to the high-order direction by the optional bit number per a machine cycle;

second selection means for selecting a vacant section of the successive predetermined bit number in a predetermined section from the least significant bit of the second shift register, and successively storing a signal of the second shift register from the high-order side of the vacant section of the second shift register;

third selection means for selecting a signal of the successive predetermined bit number in the second shift register;

variable-length encoding and decoding means for performing decoding and simultaneously outputting code length information which shows a code length of a variable-length code in the case where a signal selected by the third selection means is a variable-length code and can be decoded;

fourth selection means for selecting a signal of the successive predetermined bit number from the first shift register, outputting the same while decoding processing of the variable-length code is being performed by the variable-length encoding and decoding means, and outputting a signal input from the third selection means when the decoding processing is completed;

synchronizing word detecting means having first code detecting means for comparing the signal of the first shift register selected by the fourth selection means with a specific bit pattern to perform coincidence detection, and second code detecting means for comparing the signal of the second shift register selected by the fourth selection means with the specific bit pattern to perform coincidence detection;

specific bit pattern position information management means which, when a signal of the specific bit pattern in the first shift register is detected by the first code detecting means and a signal of the most significant bit of the specific bit code is moved to the second shift register, at this point of time, sets head bit position information of the specific bit pattern in the second shift register at that timing, and, when shift processing is generated in the second shift register, updates the head bit position information in accordance with the shift amount;

overlap detecting means which judges whether or not an overlap is generated between the variable-length code and the specific bit pattern in the second shift register, on the basis of code length information of the variable-length code from the variable-length encoding and decoding means and the head bit position information of the specific bit pattern from the specific bit pattern position information management means and, when the overlap is detected, outputs an overlap notifying signal.

2. The variable-length encoding and decoding apparatus of claim 1 wherein the specific bit pattern position information management means comprises a plurality of storage means for storing each head bit position information of plural specific bit patterns in the second shift register, and the overlap detecting means judges whether or not the overlap of the variable-length code and the specific bit pattern is generated in the second shift register by using the head bit position information closest to the most significant bit or all the head bit position information of the second shift register among the plurality of the head bit position information stored in the plurality of the storage means.

3. The variable-length encoding and decoding apparatus of claim 2 wherein the specific bit pattern position information management means initializes the head bit position information of the plurality of the storage means in the case where the head of the specific bit pattern does not exist in the second shift register, and, each time when the signal of the specific bit pattern is detected by the first code detecting means, selects one in which the head bit position information has an initial value among the plurality of the storage means thereby to set the head bit position information.

4. The variable-length encoding and decoding apparatus of claim 1 wherein, when the corresponding code does not exist in a lookup table of the variable-length code while the variable-length encoding and decoding means decodes the variable-length code signal selected by the third selection means, the variable-length encoding and decoding means outputs a maximum code length of the variable-length code in the lookup table to the overlap detecting means.

5. The variable-length encoding and decoding apparatus of claim 1 wherein, when the corresponding code does not exist in the lookup table of the variable-length code while the variable-length encoding and decoding means decodes the variable-length code signal selected by the third selection means, the variable-length encoding and decoding means outputs a value which is obtained by adding 1 to the number of bits which coincides successively from the respective most significant bits in the selected variable-length code and the variable-length code in the lookup table to the overlap detecting means.

6. The variable-length encoding and decoding apparatus of claim 1 comprising:

byte align point management means which, when the specific bit pattern in the second shift register is detected by the second code detecting means, initializes a byte align point of the bit stream at that timing and, when shift processing is generated in the second shift register, updates the byte align point in accordance with the shift amount.

7. The variable-length encoding and decoding apparatus of claim 1 comprising:

second synchronizing word detecting means which regards the most neighboring byte align point from the most significant bit of the second shift register as a reference point, in accordance with byte align point information of the byte align point management means, and compares the signal of the successive predetermined bit number with the specific bit pattern thereby to perform coincidence detection.

* * * * *